(12) United States Patent
S et al.

(10) Patent No.: US 12,488,696 B2
(45) Date of Patent: Dec. 2, 2025

(54) SYSTEMS AND METHODS FOR AIRPORT RUNWAY AWARENESS

(71) Applicant: HONEYWELL INTERNATIONAL INC., Charlotte, NC (US)

(72) Inventors: Anoop S, Bangalore (IN); Mohammed Ibrahim Mohideen, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 234 days.

(21) Appl. No.: 18/341,145

(22) Filed: Jun. 26, 2023

(65) Prior Publication Data

US 2024/0363015 A1 Oct. 31, 2024

(51) Int. Cl.
| | |
|---|---|
| *G08G 5/51* | (2025.01) |
| *G08G 5/21* | (2025.01) |
| *G08G 5/30* | (2025.01) |
| *G08G 5/80* | (2025.01) |

(52) U.S. Cl.
CPC ............ *G08G 5/51* (2025.01); *G08G 5/21* (2025.01); *G08G 5/30* (2025.01); *G08G 5/80* (2025.01)

(58) Field of Classification Search
None
See application file for complete search history.

(56) References Cited

U.S. PATENT DOCUMENTS

| | | | |
|---|---|---|---|
| 7,974,773 B1 | 7/2011 | Krenz et al. | |
| 8,380,372 B2 | 2/2013 | Michal et al. | |
| 8,812,223 B2 | 8/2014 | Durham et al. | |
| 9,117,370 B1 | 8/2015 | Jensen et al. | |
| 2010/0250030 A1* | 9/2010 | Nichols | G08G 5/55 701/3 |
| 2013/0271300 A1* | 10/2013 | Pepitone | G08G 5/21 340/972 |
| 2015/0084793 A1* | 3/2015 | Khatwa | G08G 5/51 340/969 |
| 2015/0262493 A1* | 9/2015 | Jensen | G08G 5/52 701/3 |
| 2017/0365177 A1* | 12/2017 | Puentes | G08G 5/34 |
| 2023/0060551 A1* | 3/2023 | Khatwa | G08G 5/26 |

FOREIGN PATENT DOCUMENTS

| | | |
|---|---|---|
| EP | 2487667 A1 | 8/2012 |
| WO | 2014115139 A1 | 7/2014 |

* cited by examiner

*Primary Examiner* — Aniss Chad
*Assistant Examiner* — Jennifer M Anda
(74) *Attorney, Agent, or Firm* — Ingrassia Fisher and Lorenz, LLP

(57) ABSTRACT

Systems and methods are provided for promoting intersection takeoff awareness. The system includes a database storing runway data that includes identifications and locations of runways, identifications and locations of intersections along the runways, and lengths of the runways, a sensor system configured to generate aircraft position data that includes a current position of the aircraft, a display device, and a controller configured to, by a processor: retrieve the runway data, receive the aircraft position data, identify a first intersection of a first runway as the aircraft approaches the first intersection, determine a runway distance available from the first intersection, and display, on the display device, prior to the aircraft entering the first runway, the runway distance from the first intersection and/or an indication as to whether the runway distance from the first intersection is sufficient for takeoff based on performance parameters of the aircraft and safe takeoff criteria.

18 Claims, 5 Drawing Sheets

SYSTEMS AND METHODS FOR AIRPORT RUNWAY AWARENESS

CROSS REFERENCE TO RELATED APPLICATION

The present application claims benefit of prior filed India Provisional Patent Application No. 202311030544, filed Apr. 28, 2023, which is hereby incorporated by reference herein in its entirety.

TECHNICAL FIELD

The present invention generally relates to aircraft systems, and more particularly relates to systems and methods for promoting runway awareness prior to takeoff of an aircraft by displaying runway information based on and prior to entering an intersection of the runway.

BACKGROUND

Intersection takeoffs are aircraft takeoff operations that start at a different position than the beginning of a runway, that is, from an intermediate intersection of the runway. For example, an aircraft may be cleared to depart from an intersection upon the request of the pilot or upon direction by an air traffic controller. Advantages of intersection takeoffs may include runway capacity improvements, reduced taxi times, noise alleviation, and/or reduced air pollution. However, accidents and incidents have occurred due to pilots joining a runway at a wrong intersection for takeoff and not being aware of the length of the runway available prior to entering and lining up on the runway.

Hence, there is a need for systems and methods that promote safe intersection takeoff by promoting runway awareness pertaining to, for example, runway length, intersection identification, and the like. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for promoting intersection takeoff awareness for a crew of an aircraft at an airport. In various embodiments, the method includes receiving, with a processor onboard the aircraft, runway data that includes identifications and locations of runways, identifications and locations of intersections along the runways, and lengths of the runways, receiving, with the processor, aircraft position data that includes a current position of the aircraft, identifying, by the processor, a first intersection of a first runway as the aircraft approaches the first intersection based on the runway data and the aircraft position data, determining, by the processor, a runway distance available from the first intersection based on the runway data, and displaying, on a display device onboard the aircraft by the processor, prior to the aircraft entering the first runway via the first intersection, the runway distance from the first intersection and/or an indication as to whether the runway distance from the first intersection is sufficient for takeoff based on performance parameters of the aircraft and safe takeoff criteria.

A system is provided for promoting intersection takeoff awareness for a crew of an aircraft at an airport. The system includes a database storing runway data that includes identifications and locations of runways, identifications and locations of intersections along the runways, and lengths of the runways, a sensor system configured to generate aircraft position data that includes a current position of the aircraft, a display device, a controller operatively coupled with the database, the sensor system, and the display device, the controller configured to, by a processor: retrieve the runway data from the database, receive the aircraft position data from the sensor system, identify a first intersection of a first runway as the aircraft approaches the first intersection based on the runway data and the aircraft position data, determine a runway distance available from the first intersection based on the runway data, and display, on the display device, prior to the aircraft entering the first runway via the first intersection, the runway distance from the first intersection and/or an indication as to whether the runway distance from the first intersection is sufficient for takeoff based on performance parameters of the aircraft and safe takeoff criteria.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for runway awareness for crew of a mobile platform to promote safe intersection takeoff from a runway of an airport. The mobile platform may be any type of vehicle, such as but not limited to various types of aircraft. It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to a manned airplane; however, as noted the systems and methods are not limited to such application.

The systems and methods promote safe intersection takeoff by providing various information relevant to intersection takeoff prior to the aircraft entering an intersection. In various embodiments, the systems and methods may indicate identification of an intersection, a length of the runway from the intersection, and/or notifications or warnings associated with the intersection and/or runway.

Figure 1:
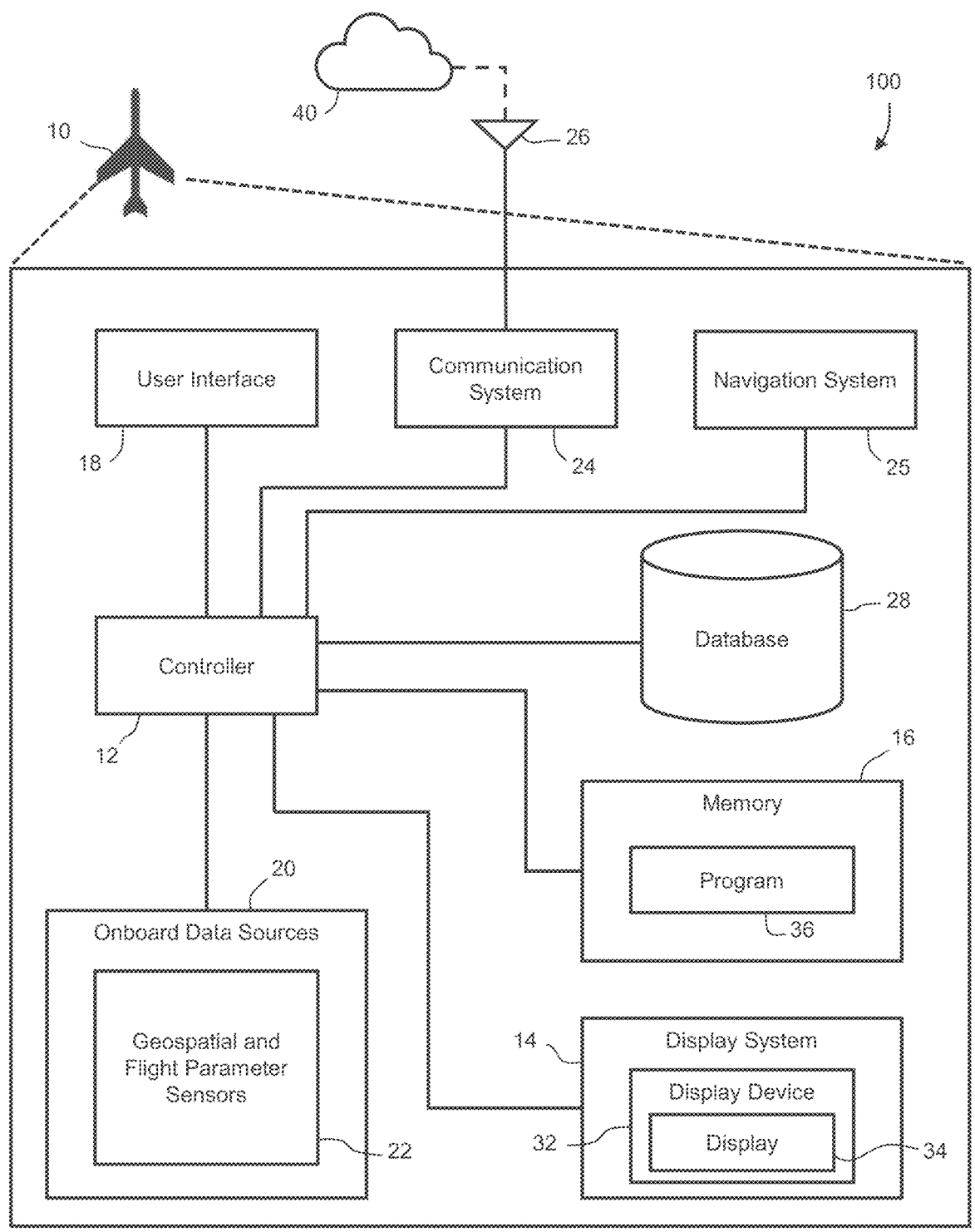
FIG. 1 schematically represents a mobile platform and components of a runway awareness system thereof in accordance with an embodiment.

Referring now to FIG. 1, an aircraft 10, in this example an airplane, and certain systems thereof are illustrated in accordance with an exemplary and non-limiting embodiment of the present disclosure. A runway awareness system 100 may be utilized onboard the aircraft 10 as described herein. As schematically depicted in FIG. 1, the system 100 includes and/or is functionally coupled to the following components or subsystems, each of which may assume the form of a single device or multiple interconnected devices, including, but not limited to, a controller 12 operationally coupled to: at least one display device 32, which may optionally be part of a larger on-board display system 14; computer-readable storage media or memory 16; an optional user interface 18, onboard data sources 20 including, for example, an array of geospatial and flight parameter sensors 22, and a navigation system 25. The system 100 may be separate from or integrated within a flight management system (FMS) and/or a flight control system (FCS). The system 100 may also contain a communication system 24 including an antenna 26, which may wirelessly transmit data to and receive data from various external sources 40 physically and/or geographically remote to the system 100 and/or the aircraft 10.

Although schematically illustrated in FIG. 1 as a single unit, the individual elements and components of the system 100 can be implemented in a distributed manner utilizing any practical number of physically distinct and operatively interconnected pieces of hardware or equipment. When the system 100 is utilized as described herein, the various components of the system 100 will typically all be located onboard the aircraft 10.

The term "controller," as appearing herein, broadly encompasses those components utilized to carry-out or otherwise support the processing functionalities of the system 100. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the aircraft 10. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms. Although only one controller 12 is shown in FIG. 1, embodiments of the aircraft 10 can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies one or more algorithms, to thereby perform the various process steps, tasks, calculations, and control/display functions described herein.

The controller 12 may exchange data with one or more external sources 40 to support operation of the system 100 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication system 24 is configured to support instantaneous (i.e., real time or current) communications between on-board systems, the controller 12, and the one or more external sources 40. The communication system 24 may incorporate one or more transmitters, receivers, and the supporting communications hardware and software required for components of the system 100 to communicate as described herein. In various embodiments, the communication system 24 may have additional communications not directly relied upon herein, such as bidirectional pilot-to-ATC (air traffic control) communications via a datalink, and any other suitable radio communication system that supports communications between the aircraft 10 and various external source(s).

The memory 16 can encompass any number and type of storage media suitable for storing computer-readable code or instructions, such as the program 36, as well as other data generally supporting the operation of the system 100. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for operating one or more systems of the aircraft 10 may be part of the system 100. In certain embodiments, the source is one or more databases 28 employed to receive and store map data, which may be updated on a periodic or iterative basis to ensure data timeliness. In various embodiments, the map data may include various terrain and manmade object locations and elevations including (e.g., airport runway identification and locations, intersection identifications and locations, etc.) and may be stored in the memory 16 or in the one or more databases 28, and referenced by the program 36. In various embodiments, these databases 28 may be available online and accessible remotely by a suitable wireless communication system, such as the communication system 24.

The sensor system 22 supplies various types of data and/or measurements to the controller 12. In various embodiments, the sensor system 22 supplies, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data. Further, in certain embodiments of the system 100, the controller 12, and the other components of the system 100 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

With continued reference to FIG. 1, the display device 32 can include any number and type of image generating devices on which one or more avionic displays 34 may be produced. In various embodiments, the display device 32 may be affixed to the static structure of the aircraft 10 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 10 cockpit by a pilot.

At least one avionic display 34 is generated on display device 32 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays 34 on which symbology, text annunciations, and other graphics pertaining to flight planning are presented for a pilot to view. The display device 32 is configured to continuously render at least one avionic display 34 showing a terrain environment at a current location of the aircraft 10. The avionic display 34 generated and controlled by the system 100 can include alphanumerical input displays of the type commonly presented on the screens of multi-function control and display units (MCDUs), as well as Control Display Units (CDUs) generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such as a touch screen display, is implemented as an integration of the user interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

The navigation system 25 can provide navigation data associated with the aircraft's current position and flight direction (e.g., heading, course, track, etc.) to the controller 12. As such, the navigation system 25 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from a flight management system. The navigation data provided to the controller 12 can also include information about the aircraft's airspeed, ground speed, altitude (e.g., relative to sea level), pitch, and other important flight information. In any event, for this example embodiment, the navigation system 25 can include any suitable position and direction determination devices that are capable of providing the controller 12 with at least an aircraft's current position (e.g., in latitudinal and longitudinal form), the real-time direction (heading, course, track, etc.) of the aircraft, and other flight information (e.g., airspeed, altitude, pitch, attitude, etc.).

Figure 2:
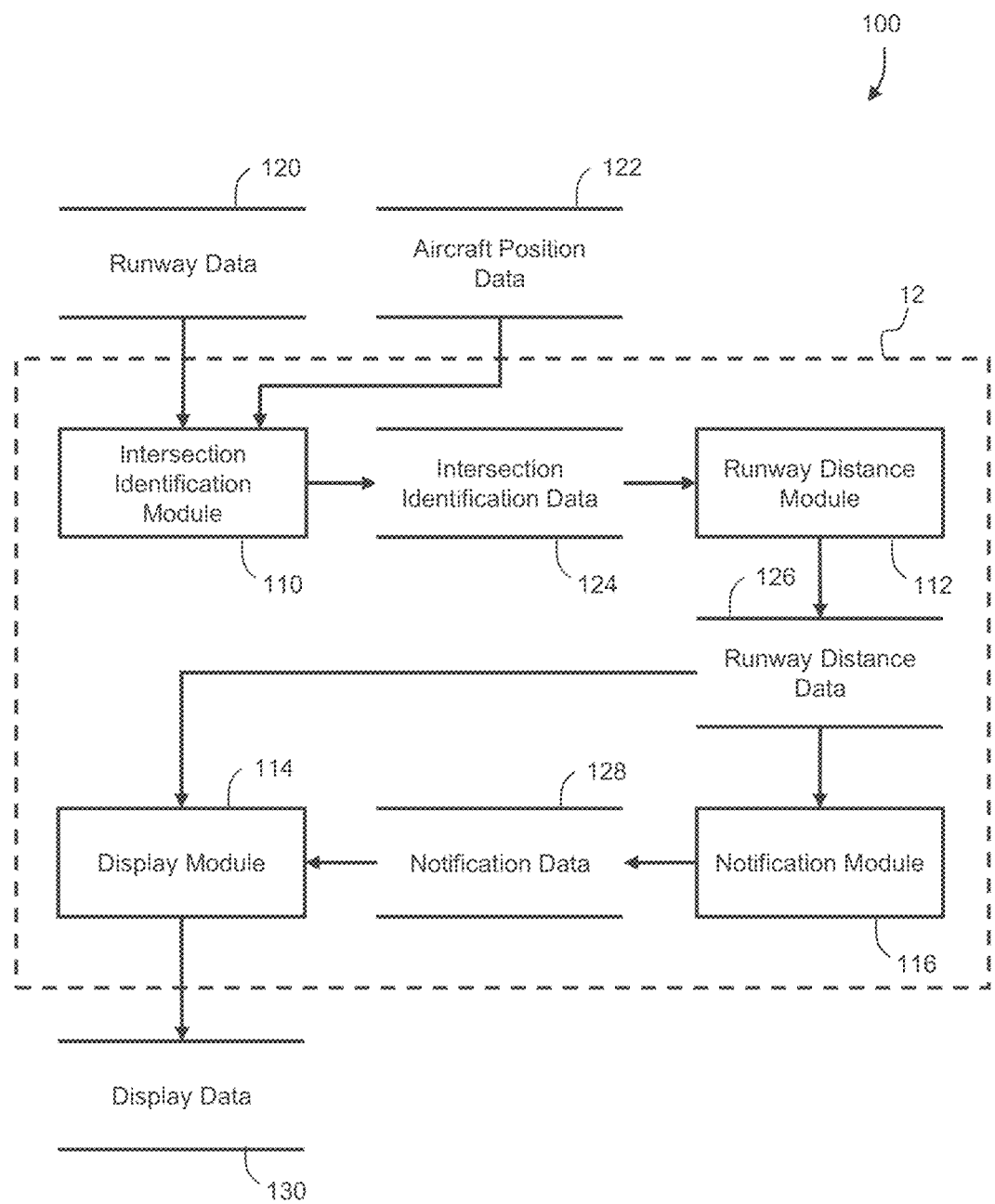
FIG. 2 is a dataflow diagram illustrating operation of the runway awareness system of FIG. 1 in accordance with an embodiment.

With reference to FIG. 2 and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 12 which may be combined and/or further partitioned to similarly implement systems and methods described herein. Furthermore, inputs to the system 100 may be received from other control modules (not shown) associated with the aircraft 10, and/or determined/modeled by other sub-modules (not shown) within the controller 12. Furthermore, the inputs might also be subjected to preprocessing, such as sub-sampling, noise-reduction, normalization, feature-extraction, missing data reduction, and the like. In various embodiments, the system 100 includes an intersection identification module 110, a runway distance module 112, a display module 114, and an optional notification module 116.

In various embodiments, the intersection identification module 110 receives as input runway data 120 retrieved from the database 28, retrieved from the memory 16, and/or received from the one or more external sources 40. The intersection identification module 110 additionally receives as input aircraft position data 122 generated by the navigation system 25 and/or the sensors 22. The runway data 120 includes various data indicating various information associated with runways and intersection of the airport, such as runway and intersection identifications, lengths, locations, and the like. The aircraft position data 122 includes various data indicating a geographic location of the aircraft 10, such as GPS coordinates. The intersection identification module 110 performs an analysis of the runway data 120 and the aircraft position data 122 to determine an identity of the intersection adjacent to the aircraft 10 prior to the aircraft 10 entering the intersection. The intersection identification module 110 generates intersection identification data 124 that includes various data indicating the identity of the intersection and various other content of the runway data 120 such as the length of the runway and the location of the intersection along the runway.

In various embodiments, the runway distance module 112 receives as input intersection identification data 124 generated by the intersection identification module 110. The runway distance module 112 determines an available distance of the runway from the intersection, optionally in both directions from the intersection. The runway distance module 112 generates runway distance data 126 that includes various data indicating the determined distance(s) of the runway from the intersection.

In various embodiments, the notification module 116 receives as input runway distance data 126 generated by the runway distance module 112. The notification module 116 performs an analysis of the runway distance data 126 to determine whether the intersection meets various takeoff safety criteria. For example, the notification module 116 may compare the identity of the intersection with an assigned intersection stored in the flight management system to ensure that the aircraft 10 is approaching the correct intersection. As another example, the notification module 116 may compare the determined distance(s) to minimum takeoff thresholds based on the aircraft parameters (e.g., weight, aircraft capabilities, relevant protocols, etc.). The notification module 116 generates notification data 128 that includes various data indicating that a notification or warning should be generated and the content, if any, of such notification or warning. In various embodiments, the notification data 128 may indicate that a textual, visual, auditory, vibration and/or other type of notification or warning should be generated.

In various embodiments, the display module 114 receives as input the runway distance data 126 generated by the runway distance module 112 and, optionally, the notification data 128 generated by the notification module 116. The display module 114 performs an analysis of the runway distance data 126 and/or the notification data 128 and generates display data 130 that includes various data configured to render, on the display 34, various information, notifications, and/or warnings associated with the intersection. For example, the display data 130 may be configured to render the identity of the intersection, the distance(s) of the runway from the intersection, indications of whether the distance(s) are safe and/or sufficient for takeoff, and any other relevant information. The display module 114 may transmit the display data 130 to the display system 14 to cause the display system 14 to render the indicated information.

Figure 3:
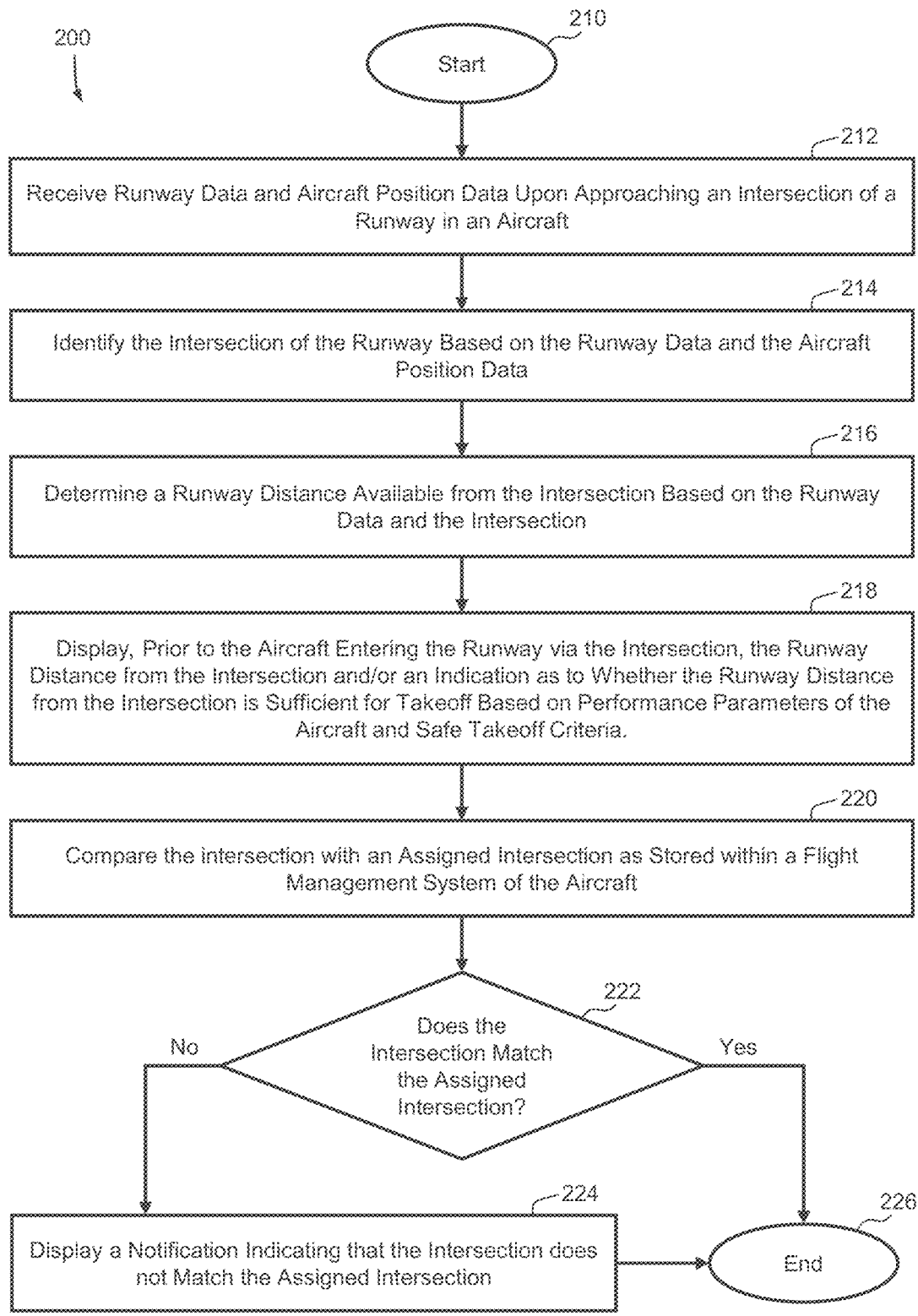
FIG. 3 is a flowchart illustrating an exemplary method for promoting runway awareness in accordance with an embodiment.

The systems disclosed herein, including the system 100, provide for methods of promoting intersection takeoff awareness for an aircraft (e.g., the aircraft 10) at an intersection of a runway. For example, FIG. 3 is a flowchart illustrating an exemplary method 200 for promoting runway awareness. The method 200 may start at 210. At 212, the method 200 may include receiving, with a processor onboard the aircraft (e.g., the processor of the controller 12), runway data and aircraft position data. At 214, the method 200 may include identifying, by the processor, the intersection of the runway based on the runway data and the aircraft position data. At 216, the method 200 may include determining, by the processor, a runway distance available from the intersection based on the runway data and the intersection.

At 218, the method 200 may include displaying, by the processor and on a display device onboard the aircraft (e.g., the display device 32), prior to the aircraft entering the runway via the intersection (e.g., while in a hold short position), the runway distance from the intersection and/or an indication as to whether the runway distance from the intersection is sufficient for takeoff based on performance parameters of the aircraft and safe takeoff criteria. In various embodiments, the displaying step may include displaying, by the processor, the runway distance from the intersection as a numerical value on the display device in a manner that indicates whether the runway distance from the intersection is sufficient for takeoff (e.g., color of text). In various embodiments, the displaying step may include displaying, by the processor, an alert in response to a determination that the runway distance from the intersection is not sufficient for takeoff.

At 220, the method 200 may include comparing, by the processor, the intersection with an assigned intersection as stored within a flight management system of the aircraft. If the intersection does not match the assigned intersection at 222, the method 200 may include displaying, at 224, by the processor and on the display device, a notification in response to the intersection not matching the assigned intersection. In various embodiments, the method 200 may include determining, by the processor, a computed runway distance between the intersection and the assigned intersection, and displaying, by the processor and on the display device, a notification in response to the computed runway distance exceeding a minimum threshold. If the intersection matches the assigned intersection at 222 or subsequent displaying the notification at 224, the method 200 may end at 226.

Figure 4:
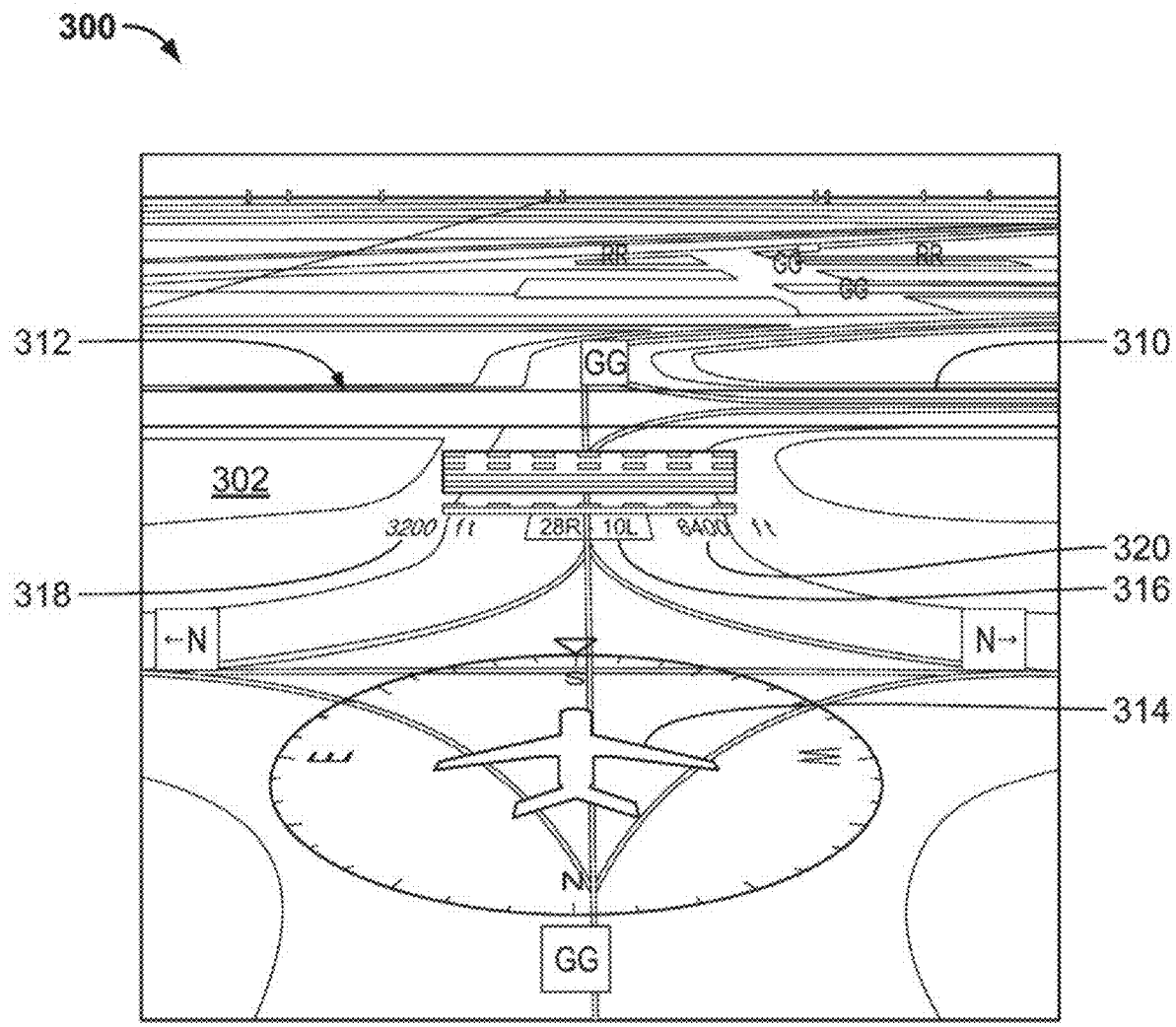
FIGS. 4 and 5 are avionic displays illustrating various nonlimiting aspects in accordance with embodiments.
Figure 5:
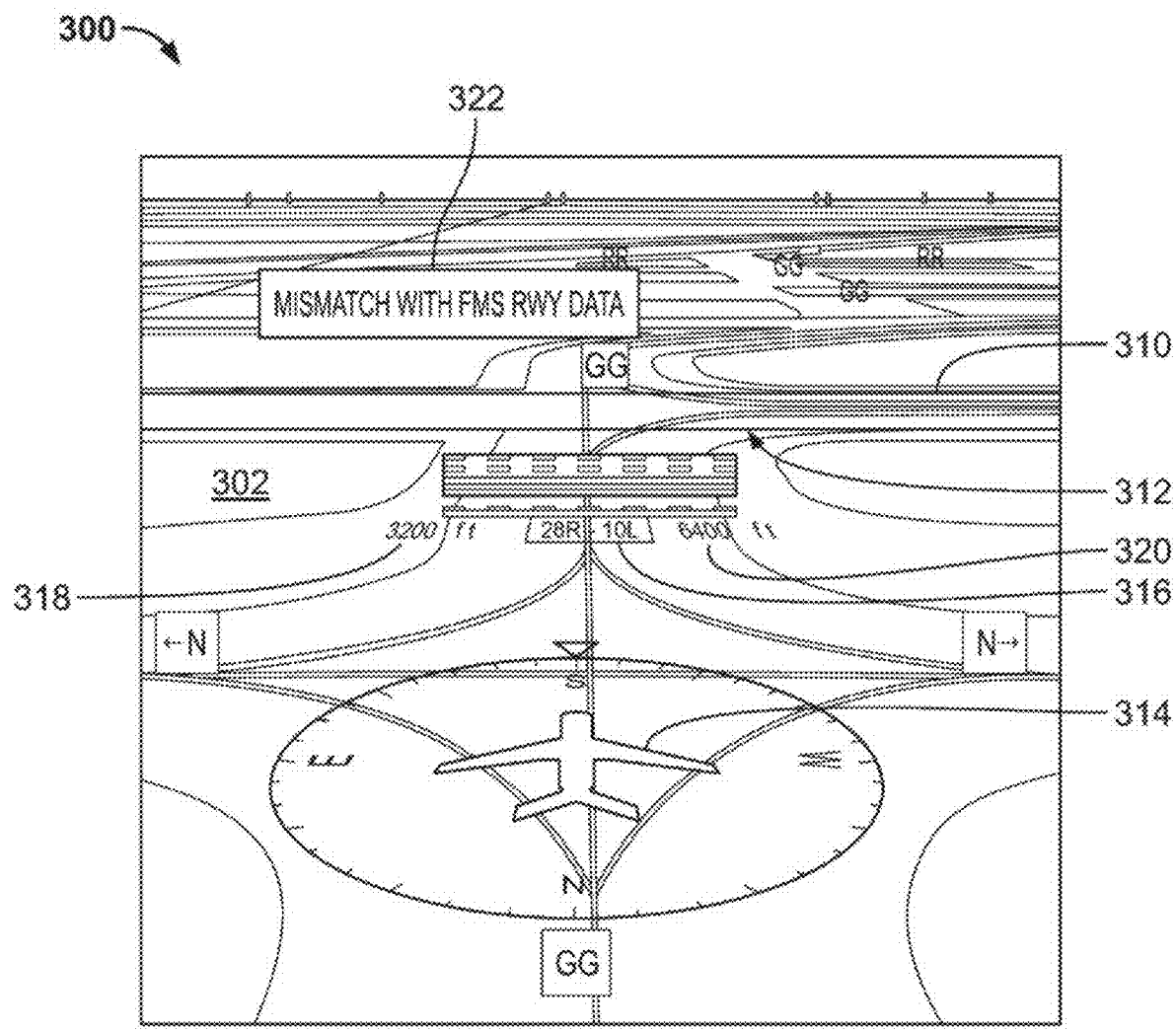

Referring now to FIGS. 4 and 5, an exemplary avionic display 300 is presented that illustrates various nonlimiting aspects of an embodiment. The avionic display 300 includes a terrain environment 302 depicting an environment adjacent to an aircraft represented by an ownship icon 314. In this example, the terrain environment includes various airport runways, intersections, pathway markings, and the like. The ownship icon 314 is encircled by a compass icon indicating a heading of the aircraft. At the moment depicted in the avionic display 300, the aircraft is approaching an intersection 312 of a runway 310 in preparation of performing an intersection takeoff operation.

In accordance with various nonlimiting aspects described herein, the avionic display 300 includes an identity 316 of the intersection, a first distance 318 of the runway from the intersection in an eastern direction and a second distance 320 of the runway from the intersection in a western direction. In various embodiments, the avionic display 300 may include indications related to the sufficiency and/or safety of the first and second distances 318 and 320. For example, one or both of the first and second distances 318 and 320 may be colored green if sufficient for takeoff or red if insufficient for takeoff.

In various embodiments, one or more notifications and/or warnings may be displayed on the avionic display 300. For example, FIG. 5 presents the avionic display 300 as including a notification 322 that indicates that the runway and/or intersection does not match the assigned runway or intersection stored in a flight management system (FMS) of the aircraft.

The systems and methods disclosed herein provide various benefits over certain existing systems and methods in the field of aircraft systems, and particularly aircraft systems related to taxiing and takeoff operations. For example, although intersection takeoffs may provide various benefits, these operations may be susceptible to accidents and incidents due to human error, such as entering a runway at a wrong intersection for takeoff that does not provide sufficient runway length for a safe takeoff. The systems and methods promote safe intersection takeoff by promoting runway awareness for the crew of aircraft. In various embodiments, the systems and methods provide intersection takeoff awareness for an aircraft at an intersection of a runway by receiving runway data and aircraft position data, identifying the intersection of the runway based on the runway data and the aircraft position data, determining a runway distance available from the intersection based on the runway data and the intersection, and displaying on a display device onboard the aircraft, prior to the aircraft entering the runway via the intersection, the runway distance from the intersection and/or an indication as to whether the runway distance from the intersection is sufficient for takeoff based on performance parameters of the aircraft and safe takeoff criteria. As such, the systems and methods effectuate an improvement to aircraft systems by promoting safety during taxiing and takeoff operations.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for promoting intersection takeoff awareness for a crew of an aircraft at an airport, the method comprising:
   receiving, with a processor onboard the aircraft, runway data that includes identifications and locations of runways, identifications and locations of intersections along the runways, and lengths of the runways;
   receiving, with the processor, aircraft position data that includes a current position of the aircraft;
   identifying, by the processor, a first intersection of a first runway as the aircraft approaches the first intersection based on the runway data and the aircraft position data;
   determining, by the processor, a runway distance available from the first intersection based on the runway data; and
   displaying, on a display device onboard the aircraft by the processor, prior to the aircraft entering the first runway via the first intersection, the runway distance from the first intersection and/or an indication as to whether the runway distance from the first intersection is sufficient for takeoff based on performance parameters of the aircraft and safe takeoff criteria;

comparing the first intersection with an assigned intersection as stored within a flight management system of the aircraft;

determining a computed runway distance between the first intersection and the assigned intersection; and displaying, on the display device, a notification in response to the computed runway distance exceeding an intersection distance threshold.

2. The method of claim 1, wherein the displaying step includes displaying, by the processor, the runway distance from the first intersection as a numerical value on the display device in a manner that indicates whether the runway distance from the first intersection is sufficient for takeoff.

3. The method of claim 2, wherein the numerical value has a color indicative of whether the runway distance from the first intersection is sufficient for takeoff.

4. The method of claim 1, wherein the displaying step includes displaying, by the processor, an alert in response to a determination that the runway distance from the first intersection is not sufficient for takeoff.

5. The method of claim 1, further comprising displaying, on the display device by the processor, the identity of the first intersection.

6. The method of claim 1, wherein the runway distance is determined in a first direction along the first runway, the method further comprising, by the processor:

determining a second runway distance available from the first intersection as measured in a second direction along the first runway opposite of the first direction based on the runway data; and displaying, on the display device, prior to the aircraft entering the first runway via the first intersection, the second runway distance from the first intersection and/or an indication as to whether the second runway distance from the first intersection is sufficient for takeoff based on the performance parameters of the aircraft and the safe takeoff criteria.

7. The method of claim 1, further comprising, by the processor:

comparing the first intersection with the assigned intersection as stored within a flight management system of the aircraft; and displaying, on the display device, a notification in response to the first intersection not matching the assigned intersection.

8. The method of claim 1, wherein the display device displays a terrain environment including representations of the first runway and the first intersection, wherein the displaying step includes displaying, by the processor, at least one visual graphic on the terrain environment representing the runway distance from the first intersection and/or the indication as to whether the runway distance from the first intersection is sufficient for takeoff.

9. The method of claim 1, wherein the steps of identifying the first intersection, determining the runway distance, and displaying the runway distance and/or the indication as to whether the runway distance is sufficient are all performed while the aircraft is in a designated hold short position.

10. A system for promoting intersection takeoff awareness for a crew of an aircraft at an airport, the system comprising:

a database storing runway data that includes identifications and locations of runways, identifications and locations of intersections along the runways, and lengths of the runways;

a sensor system configured to generate aircraft position data that includes a current position of the aircraft;

a display device; and a controller operatively coupled with the database, the sensor system, and the display device, the controller configured to, by a processor:

retrieve the runway data from the database;

receive the aircraft position data from the sensor system;

identify a first intersection of a first runway as the aircraft approaches the first intersection based on the runway data and the aircraft position data;

determine a runway distance available from the first intersection based on the runway data;

display, on the display device, prior to the aircraft entering the first runway via the first intersection, the runway distance from the first intersection and/or an indication as to whether the runway distance from the first intersection is sufficient for takeoff based on performance parameters of the aircraft and safe takeoff criteria;

compare the first intersection with an assigned intersection as stored within a flight management system of the aircraft;

determine a computed runway distance between the first intersection and the assigned intersection; and display, on the display device, a notification in response to the computed runway distance exceeding an intersection distance threshold.

11. The system of claim 10, wherein the controller is configured to, by the processor, display the runway distance from the first intersection as a numerical value on the display device in a manner that indicates whether the runway distance from the first intersection is sufficient for takeoff.

12. The system of claim 11, wherein the controller is configured to, by the processor, display the numerical value in a color indicative of whether the runway distance from the first intersection is sufficient for takeoff.

13. The system of claim 10, wherein the controller is configured to, by the processor, display an alert in response to a determination that the runway distance from the first intersection is not sufficient for takeoff.

14. The system of claim 10, the controller is configured to, by the processor, display, on the display device by the processor, the identity of the first intersection.

15. The system of claim 10, wherein the controller is configured to, by the processor:

determine the runway distance in a first direction along the first runway;

determine a second runway distance available from the first intersection as measured in a second direction along the first runway opposite of the first direction based on the runway data; and display, on the display device, prior to the aircraft entering the first runway via the first intersection, the second runway distance from the first intersection and/or an indication as to whether the second runway distance from the first intersection is sufficient for takeoff based on the performance parameters of the aircraft and the safe takeoff criteria.

16. The system of claim 10, the controller is configured to, by the processor:

compare the first intersection with the assigned intersection as stored within a flight management system of the aircraft; and display, on the display device, a notification in response to the first intersection not matching the assigned intersection.

17. The system of claim 10, the controller is configured to, by the processor:

display, on the display device, a terrain environment including representations of the first runway and the first intersection; and display at least one visual graphic on the terrain environment representing the runway distance from the first intersection and/or the indication as to whether the runway distance from the first intersection is sufficient for takeoff.

18. The system of claim 10, the controller is configured to, by the processor, identify the first intersection, determine the runway distance, and display the runway distance and/or the indication as to whether the runway distance is sufficient while the aircraft is in a designated hold short position.

\* \* \* \* \*